US006802419B2

(12) United States Patent
Joyce et al.

(10) Patent No.: US 6,802,419 B2
(45) Date of Patent: Oct. 12, 2004

(54) PACKAGE FORM AND METHOD OF MAKING A PACKAGE

(75) Inventors: Anthony B. Joyce, North Hollywood, CA (US); Moises Lopez, Chico, CA (US)

(73) Assignee: Bert CO Industries, Inc., Los Angeles, CA (US)

( * ) Notice: Subject to any disclaimer, the term of this patent is extended or adjusted under 35 U.S.C. 154(b) by 179 days.

(21) Appl. No.: 10/269,505

(22) Filed: Oct. 11, 2002

(65) Prior Publication Data

US 2004/0069663 A1 Apr. 15, 2004

(51) Int. Cl.⁷ .............................................. B65D 85/57
(52) U.S. Cl. ................................... 206/308.1; 206/312
(58) Field of Search ............................ 206/308.1, 311, 206/312, 313, 387.13, 472, 232; 53/410, 128.1

(56) References Cited

U.S. PATENT DOCUMENTS

| ,404,411 A | 6/1889 | Huewe |
| ,909,410 A | 1/1909 | Hirsch |
| ,958,059 A | 5/1910 | Wright |
| 1,186,312 A | 6/1916 | Hanselmann |
| 1,266,091 A | 5/1918 | Basch |
| 1,463,413 A | 7/1923 | Wilburger |
| 1,502,312 A | 7/1924 | Mayhew |
| 2,112,062 A | 3/1938 | Berger ......................... 299/27 |
| 2,189,076 A | 2/1940 | Liskin ....................... 229/87.5 |
| 2,287,365 A | 6/1942 | Widder et al. ................ 129/15 |
| 2,384,633 A | 9/1945 | Markowski .................. 206/82 |
| 2,419,187 A | 4/1947 | Jolly ........................... 40/152 |
| 2,436,744 A | 2/1948 | Chouinard ................... 129/20 |
| 2,463,338 A | 3/1949 | Wechsler ..................... 206/80 |
| 2,600,023 A | 6/1952 | Rice ............................ 206/62 |
| 2,721,556 A | 10/1955 | Zandelin ...................... 129/20 |

(List continued on next page.)

FOREIGN PATENT DOCUMENTS

| CA | 1198208 | 12/1985 | |
| DE | 3425579 A1 | 1/1986 | |
| EP | 0159860 A2 | 10/1985 | |
| FR | 1050913 | 9/1953 | ................. 206/312 |
| GB | 2135274 A | 8/1984 | |
| GB | 2147262 A | 5/1985 | |
| JP | 3827510 | 12/1938 | |
| JP | 5054108 | 9/1948 | |

(List continued on next page.)

OTHER PUBLICATIONS

Aug. 24, 2001 e–mail from Jose Sosa concerning the Moulin Rouge DVD Digipak. (1 page).

(List continued on next page.)

*Primary Examiner*—Jacob K. Ackun, Jr.
(74) *Attorney, Agent, or Firm*—Sheldon & Mak; Edward C. Schewe

(57) ABSTRACT

A form for a package for holding consumer articles including optically-based media. The form is comprised of a base member comprised of a first section with one or more tandem slots and a second section with one or more corresponding tandem fold lines. The first section is folded over onto the second section and then secured to the second section so that the tandem slots at least partially fit over the corresponding set of tandem fold lines. Holders, such as one or more trays for digital video disks, can be secured to this two layer thick assembly. The assembly with the holders and their contents can then be folded-up along the tandem fold lines into a book-like configuration without substantial binding or creasing of the overlying first section. The invention includes the package made from the form and a method of making that package.

12 Claims, 3 Drawing Sheets

U.S. PATENT DOCUMENTS

| | | | |
|---|---|---|---|
| 3,132,795 A | 5/1964 | Allison | 229/68 |
| 3,145,026 A | 8/1964 | Shaw | 274/42 |
| 3,232,423 A | 2/1966 | Smiler | 206/62 |
| 3,292,285 A | 12/1966 | Kitayama | 40/64 |
| 3,556,391 A | 1/1971 | Kosterka | 229/68 |
| 3,594,976 A | 7/1971 | Jackson | 53/31 |
| 3,620,552 A | 11/1971 | Woodcock | 281/33 |
| 3,640,447 A | 2/1972 | Forbes, Jr. et al. | 229/17 R |
| 3,688,898 A | 9/1972 | Stanton | 206/62 P |
| 3,698,544 A | 10/1972 | Growney | 206/45.11 |
| 3,717,397 A | 2/1973 | Perry | 229/72 |
| 3,743,081 A | 7/1973 | Roberg et al. | 206/1 R |
| 3,785,478 A | 1/1974 | Drori | 206/45.31 |
| 3,819,093 A | 6/1974 | Forbes, Jr. | 222/529 |
| 3,869,820 A | 3/1975 | Holson | 40/159 |
| 3,946,937 A | 3/1976 | Forbes, Jr. et al. | 229/51 TC |
| 4,002,355 A | 1/1977 | Sendor | 281/29 |
| 4,084,690 A | 4/1978 | Pulse | 206/310 |
| 4,101,028 A | 7/1978 | Woolbright | 206/311 |
| 4,108,307 A | 8/1978 | Feingold et al. | 206/387 |
| 4,166,570 A | 9/1979 | Lazerand et al. | 229/52 B |
| 4,176,744 A | 12/1979 | Borzak | 206/303 |
| 4,240,761 A | 12/1980 | Jacobson | 402/76 |
| D264,602 S | 5/1982 | Plutsky | D19/26 |
| 4,327,831 A | 5/1982 | Inaba et al. | 206/310 |
| 4,365,708 A | 12/1982 | Tyus | 206/309 |
| 4,387,804 A | 6/1983 | Austin | 206/218 |
| 4,433,780 A | 2/1984 | Ellis | 206/232 |
| 4,473,153 A | 9/1984 | Colangelo | 206/312 |
| 4,488,645 A | 12/1984 | Yamaguchi | 206/444 |
| 4,501,361 A | 2/1985 | Rose, Jr. | 206/493 |
| 4,511,034 A | 4/1985 | Pan | 206/310 |
| 4,520,927 A | 6/1985 | Sato | 206/387 |
| 4,535,888 A | 8/1985 | Nusselder | 206/444 |
| 4,635,792 A | 1/1987 | Yamada et al. | 206/310 |
| 4,709,812 A | 12/1987 | Kosterka | 206/310 |
| 5,682,990 A * | 11/1997 | Schluger | 206/308.1 |
| 6,681,928 B1 * | 1/2004 | Siek et al. | 206/308.1 |
| 6,715,607 B2 * | 4/2004 | Wetsch | 206/312 |

FOREIGN PATENT DOCUMENTS

| | | |
|---|---|---|
| JP | 5118742 | 5/1976 |
| JP | 57173174 | 4/1981 |
| JP | 5653501 | 12/1981 |
| JP | 5856379 | 4/1983 |
| JP | 59161561 | 10/1984 |
| JP | 59185769 | 12/1984 |
| JP | 59185772 | 12/1984 |
| JP | 6015887 | 2/1985 |
| JP | 331748 | 7/1991 |

OTHER PUBLICATIONS

Aug. 27, 2001 Bert–Co Graphics/Design Center Sample Request Form and drawings. (3 pages).

Bert–Co Graphics Layout Draft dated Sep. 7, 2001 (created and Sep. 19, 2001 (modified) for the Moulin Rouge project. (1 page).

Sep. 24, 2001 Bert–Co Graphics Proof #1 for the Moulin Rouge job. (1 page).

Photograph of Grateful Dead Record Album Cover, "Europe 1972" ©1972, Warner Bros. Records Inc.

Photograph of Neil Diamond Album "Jonathan Livingston Seagull Original Motion Picture Soundtrack," ©1973 CBS, Inc.

Handbook of Folding Carton Style Nomenclatue, © 1988, Paperboard Packaging Council.

Copies of photographs of Exhibit 115 from the Deposition of James Ladwig taken on Jun. 28, 2002, and pages from the Jun. 28, 2002 deposition transcript identifying Exhibit 115.

A Copy of Exhibit 115A from the Deposition of James Ladwig taken on Jun. 28, 2002, and pages from the Jun. 28, 2002 deposition transcript identifying Exhibit 115A.

* cited by examiner

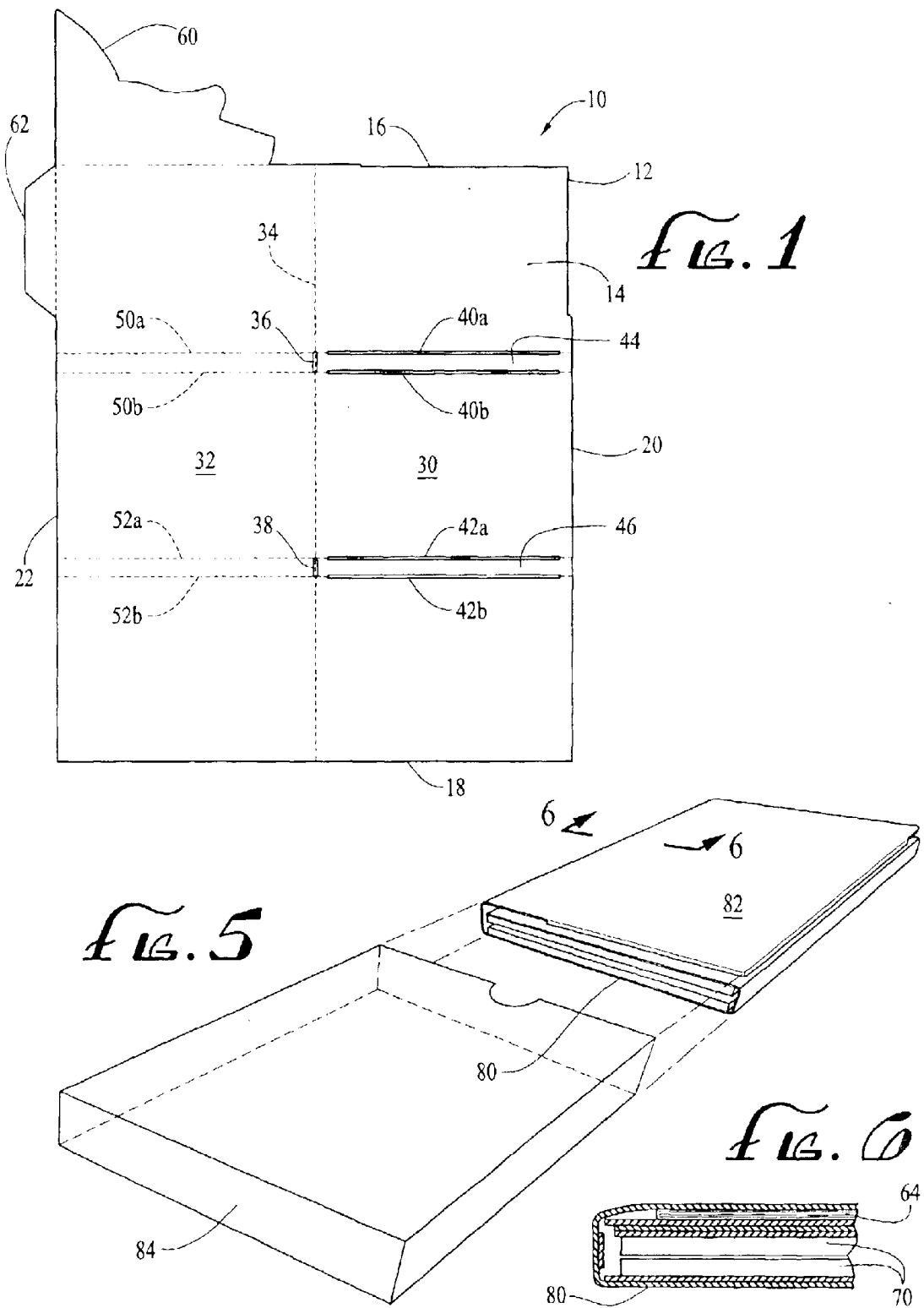

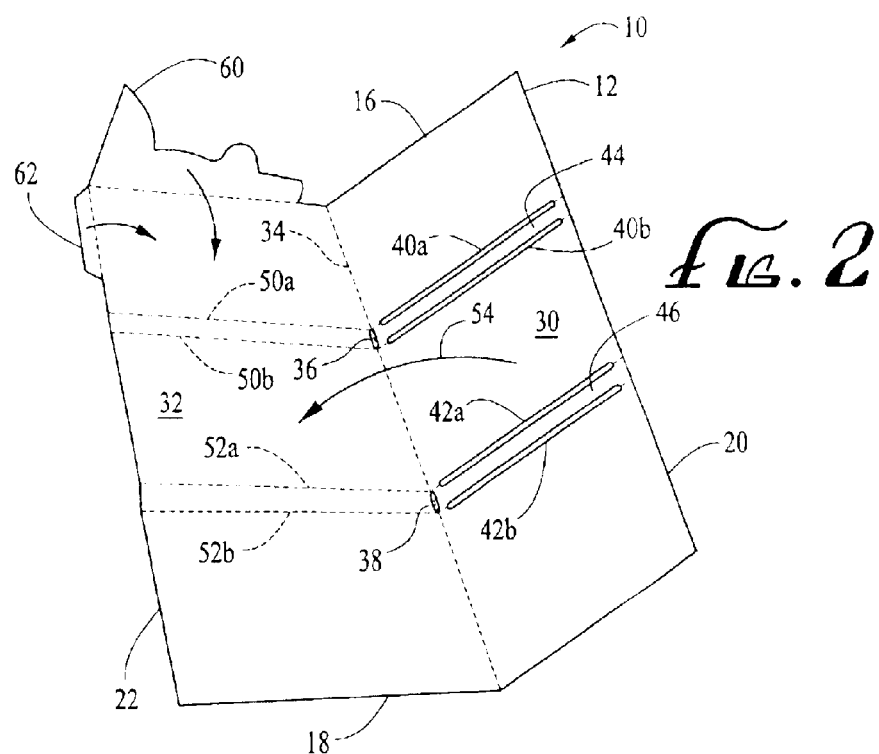
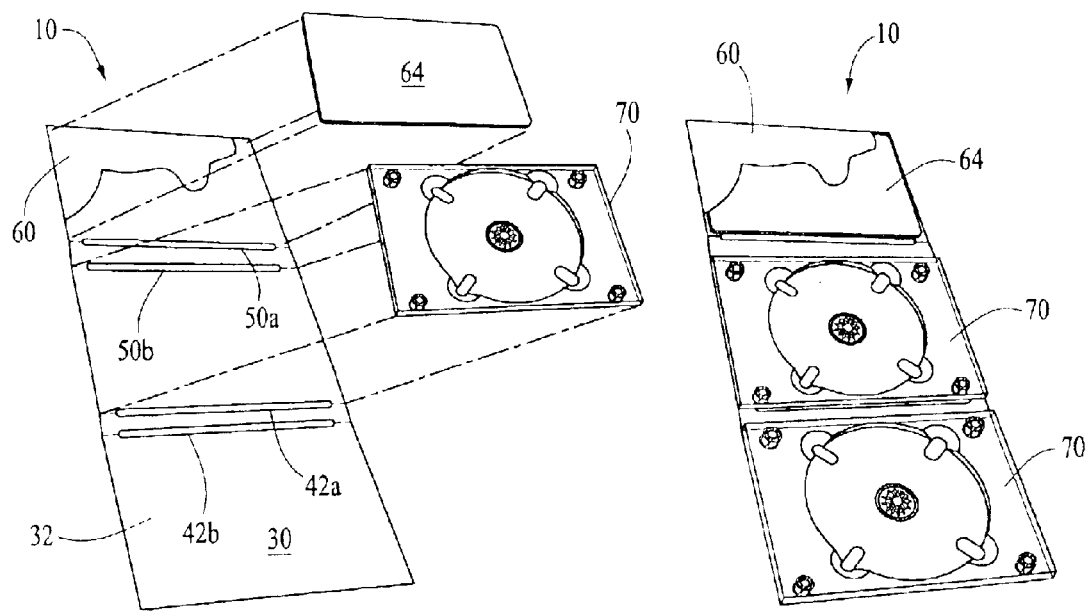

PACKAGE FORM AND METHOD OF MAKING A PACKAGE

BACKGROUND

The use of die-cut paperboard for packaging a variety of consumer goods is increasingly popular. Paperboard is versatile, lightweight and relatively low in cost. It is also beneficial for a packaging manufacturer to provide a number of package styles which are producible from a common form, yet appear to be different when finished.

A type of packaged consumer good that is increasingly popular is optically-based media. Optically-based media are used for the recording and distribution of computer programs, music, video programs and for the storage of various types of digital data. In the context of digital video disks ("DVDs"), it is often desired to produce and sell DVDs in multi-disk sets. Examples of such sets are collections of several motion pictures, collections of television programs having a common featured actor or subject matter and collections of several episodes of a popular television series.

It has become common to market a collection of DVDs in a package which opens and closes in a book-like manner. The package may include an individual plastic tray for each DVD in the set with the trays being mounted to different "pages" of a paperboard element which is foldable onto itself into a compact closed form. The paperboard stock commonly used in the manufacture of such a package is relatively light in weight and is preferred because of its low cost per unit area.

It is desirable to minimize waste from the paperboard stock and to have a strong paperboard element. Moreover, if the paperboard element is made of a folded sheet, is it desirable to have both a strong bond between the folded surfaces. Thus, it is desirable to have a large surface area available to apply an adhesive between the folded portions to allow for a stronger connection.

Conventional paperboard stock packages described as useful for packaging compact discs have inherent shortcomings. For example, U.S. Pat. No. 4,709,812 describes a compact disc ("CD") package that is made from a folded-up rectangular sheet configuration with large die-cut slots. When the rectangular sheet is folded and compact disc holders are attached, the die-cut slots allow the now folded rectangular sheet to be folded-up upon itself into a book-like configuration. Since the rectangular sheet is most economically obtained from large sheets of paperboard, the slotted configuration shown in U.S. Pat. No. 4,709,812 creates wasted paperboard stock from die-cutting the slots. After thousands of die cut packages over time, the waste paperboard stock can add up to increased costs for the manufacturer. In addition, the open slots reduce the surface area that can be used to secure the overlying paperboard sections to each other.

Thus, there is a need for an improved package form and method of making a package to reduce waste paperboard stock generated by conventional paperboard packages. There is also a need for an improved package form that increases the amount of available surface area of overlying paperboard sections that will be secured together.

SUMMARY

The present invention is an improvement over conventional prior art packages and methods of making packages. The present invention enables one to manufacture packages of different styles from a single form. It also reduces the excess waste paperboard generated by die-cutting conventional paperboard packages and increases the surface area available for securing the overlying paperboard sections together.

The present invention has an advantage over conventional fold-over packages because of the optimum slot sizes and added surface area between the slots. In one version, the form comprises a base member having a surface with a top, a bottom, and opposing first and second sides. The base member is preferably divided into a first section and a second section that are separated by a main fold line.

The first section includes one or more tandem slots which are preferably two closely spaced narrow slots separated by a portion of the base member. The second section comprises a corresponding number of tandem fold lines. For example, if the first section has one set of tandem slots, the second section then preferably has one set of corresponding tandem fold lines opposite the tandem slots.

The base member is configured so that the first section can be folded onto the second section along the main fold line and the tandem slots at least partially fit over the tandem fold lines. The folded-over first section, including the portion between the tandem slots, is secured to the second section by an adhesive or other conventional methods. Thereafter, one or more holders can be secured to the back side of the first section. The form can then be folded-up upon itself into a book-like package along the tandem fold lines without substantially creasing or bending the folded over first section. The folded-up package can later be re-opened when desired to remove the article(s) in the package. In one version, the holders comprise trays for digital video disks.

The version can include an end flap adjacent to the top of the base member and can include one or more tabs, also adjacent to the top. The end flap can be folded-over and preferably is secured to the tab or tabs by an adhesive to create a pocket for holding printed materials such as a booklet, manuals or various promotional materials.

The present invention includes a method of making a package from the inventive form. Following the above steps, the first section is first folded over onto the second section. The first section is secured to the second section so that the tandem slots partially fit over the tandem fold lines and one or more holders are secured onto the combination of the first and second sections.

DRAWINGS

FIG. 1 is a plan view of an example of a form for a package according to the present invention;

FIG. 2 is a perspective view of the form of FIG. 1, showing the folding of the first section onto the second section and the folding of the end flap and a tab;

FIG. 3 is a perspective view of the form of FIG. 1 showing the possible placement of a holder and a booklet;

FIG. 4 is another perspective view showing the form of FIG. 1 with multiple holders secured to the folded-up form and the placement of a booklet;

FIG. 5 shows a package and a slipcase, the package resulting from the form of FIG. 4 being folded-up into a package;

FIG. 6 is a partial section view of the package of FIG. 5 taken along line 6—6.

DESCRIPTION

Figure 7:
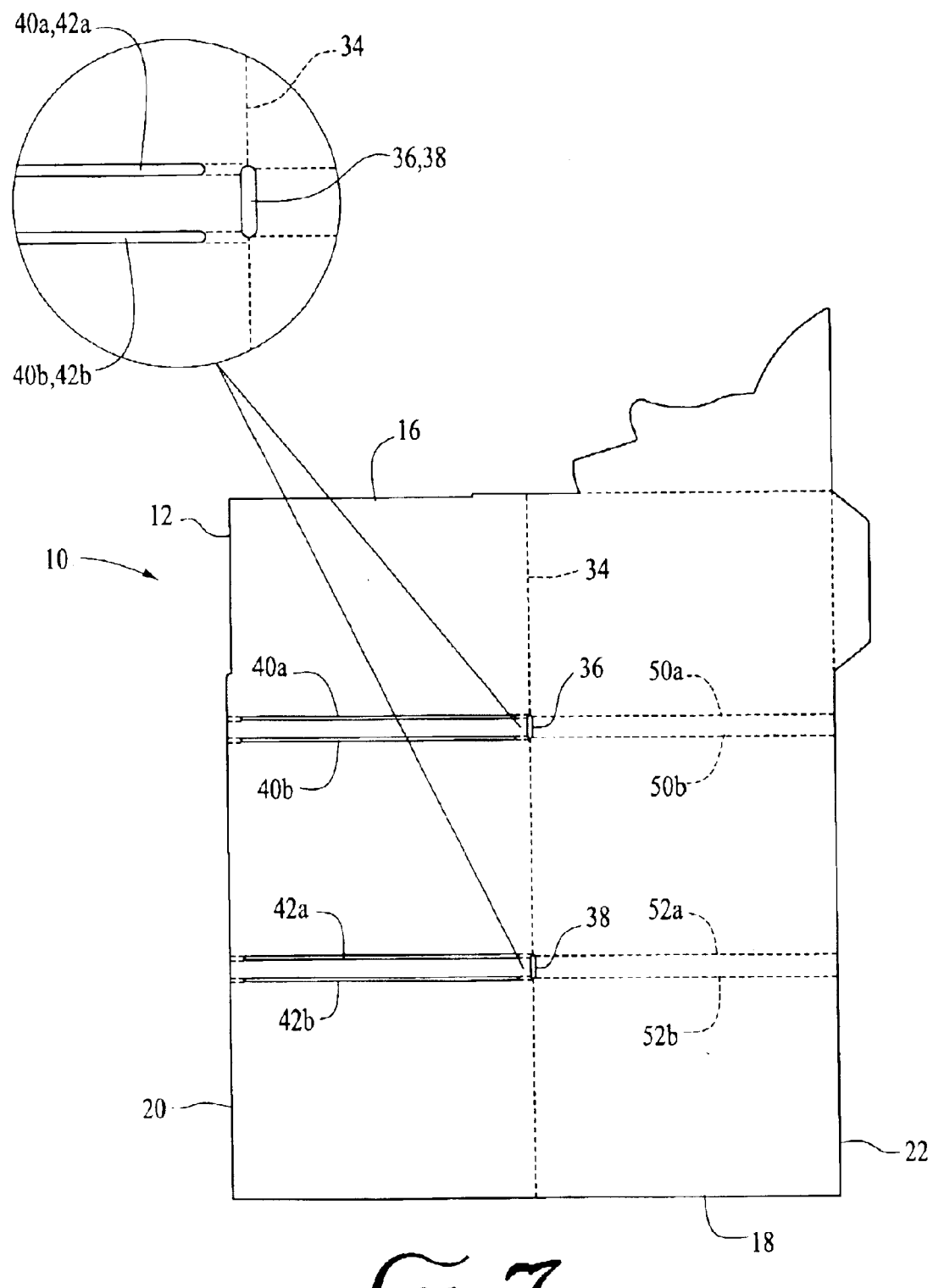
FIG. 7 is another example of one embodiment of the present invention showing the reverse scores in detail.

The present invention is an improvement over conventional package forms and methods of making package forms. Referring to the Figures, a preferred form 10 according to the present invention is shown in FIG. 1. The form 10 is preferably made of paperboard. The form 10 comprises a base member 12 having an upper surface 14 and a top 16, a bottom 18, a first side 20 and a second side 22. The upper surface 14 is preferably planar but other surface configurations including three dimensional configurations are included in the scope of the present invention.

The base member 12 preferably comprises a first section 30 and a second section 32 that span between the top 16 and the bottom 18 of the form 10. Preferably, the sections 30 and 32 both have a substantially rectangular configuration. The first section 30 need not be the same size or configuration as the second section 32. As shown in FIG. 1, the first section 30 is separated from the second section 32 by the main fold line 34.

The first section 30 comprises tandem slots 40a and 40b separated by an adjoining strip 44 of the base member and preferably comprises a second set of tandem slots 42a and 42b separated by a strip 46 as shown in FIG. 1. Preferably, the slots 40a, 40b, 42a and 42b have an obround configuration.

The strips 44 and 46 are preferably narrow in width compared to the longitudinal width of the first section 30 that spans from the top 16 to the bottom 18. The present invention is not limited to two sets of tandem slots 40, 42 and strips 44, 46 and the form or package of the present invention may have additional slots or additional tandem slots and adjoining strips.

The second section 32 comprises tandem fold lines 50a and 50b and preferably comprises a second set of tandem fold lines 52a and 52b as shown in FIG. 1. The tandem fold lines 50a and 50b are opposite the tandem slots 40a and 40b and the tandem fold lines 52a and 52b are opposite the tandem slots 42a and 42b. The present invention is not limited to two sets of tandem fold lines 50, 52 and the form or package of the present invention may have additional fold lines or sets of fold lines. A score 36 is placed in the main fold line 34 between the slots 40a and 40b on the one hand, and the fold lines 50a and 50b on the other. A score 38 is placed in the main fold line 34 between the slots 42a and 42b on the one hand and the fold lines 52a and 52b on the other. Preferably, the score 36 and the score 38 comprise cuts or reverse scores in the base member 12. The scores 36 and 38 can be reverse scores meaning that they are scored from the backside of the base member 12, not the front or printed side. By using this technique of reverse scores, 36 and 38, the inventors were able to produce the form 10 without the buckling and memory problems usually associated with folding scores over scores.

FIG. 2 shows (by an arrow 54) the folding of the first section 30 onto the second section 32 along the main fold line 34. This folding is such that the tandem slots 40a and 40b at least partially fit over the tandem fold lines 50a and 50b and the tandem slots 42a and 42b at least partially fit over the tandem fold lines 52a and 52b. This configuration is shown in FIG. 3 and is shown folded-up in a book-like manner in FIG. 5.

The first section 30 can be secured to the second section 32 by conventional methods such as adhesives, glue or other techniques well known to persons skilled in the art. The strips 44 and 46 can also be secured onto the overlying portions of the second section 32.

Preferably, the form 10 has an end flap 60 and an adjacent tab 62 as shown in FIG. 1. The end flap 60 and the tab 62 are folded over as shown in FIG. 2 so that the underside of the end flap 60 can be secured to the folded-over tab 62 by an adhesive such as glue or other conventional techniques. The end flap 60 thus forms a pocket in cooperation with the backside of the folded-over first section 30. A booklet 64 can be inserted between the folded-over end flap 60 and the folded-over first section 30 as shown in both FIG. 3 and FIG. 4.

One or more holders, such as trays 70 as used for DVDs, may be attached to the folded over first section 30 as shown in FIG. 3. The trays 70 can be secured to this arrangement, comprised of two layers of the base member 12 as a result of adherence of the first section 30 to the second section 32, by conventional methods such as adhesives, glue or other techniques well known to persons skilled in the art. FIG. 4 illustrates one version of the present invention showing multiple trays 70 secured onto the backside of the first section 30.

FIG. 5 shows a book-like package 80 folded up from the form in FIG. 4. The arrangement of the tandem slots 40 and 42 at least partially folded over the corresponding tandem fold lines 50a, 50b, 52a and 52b allows for fold patterns between adjacent trays 70 and between a tray 70 and the booklet 64. This allows the form 10 to be folded-up onto itself along the fold lines 50a, 50b, 52a and 52b as shown in FIG. 5 without substantial binding or creasing of the overlying first section 30.

Preferably, the outermost surface 82 of package 80 is pre-printed with a design or other information to reflect the contents of the package 80. Preferably, the package 80 is housed in a sleeve or slipcase 84. FIG. 6 shows a book-like package in a partial cut away section view showing one arrangement of the contents of the package 80 shown in FIG. 5.

Thus, an improved form for use in a book-like package is shown and described and an improved method of making the package from this form is shown and described.

Although the present invention has been described in considerable detail with reference to certain preferred versions thereof, other versions are possible. For example, additional sections may be included or utilized. The form can be made of plastic. The holders can be holders for many types of consumer items, such as holders for compact discs ("CDs") and holders for cassette tapes as two examples.

Therefore, the spirit and scope of the appended claims should not be limited to the description of the preferred versions contained herein. All features disclosed in the specification, including the claims, abstract, and drawings, and all the steps in any method or process disclosed, may be combined in any combination, except combinations where at least some of such features and/or steps are mutually exclusive or inconsistent or incompatible with each other. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features. Also, any element in a claim that does not explicitly state "means for" performing a specified function or "step for" performing a specified function, should not be interpreted as a "means" or "step" clause as specified in 35 U.S.C. § 112.

What is claimed is:

1. A foldable form for a package comprising:
   a base member having a surface with a top, a bottom, a first side and a second side, the base member comprising first and second sections separated by a main fold line,
   the first section comprising at least one pair of tandem slots separated by a portion of the base member, the tandem slots extending between the main fold line and the first side,
   the second section comprising at least one pair of tandem fold lines extending between said main fold line and the second side and positioned opposite the tandem slots,
   the first section being adapted to be folded onto and secured to the second section so that the tandem slots at least partially fit over the corresponding tandem fold lines; and
   the combination of the first and second sections secured together and adapted for mounting one or more holders thereto;
   wherein the form can then be folded up into a book-like package.

2. The form of claim 1 further comprising a foldable end flap adjacent to the top.

3. The form of claim 1 further comprising a foldable end flap adjacent to the top and one or more tabs adjacent to the top.

4. The form of claim 1 wherein the holders comprise trays for digital video disks.

5. The form of claim 1 wherein each of the tandem slots comprise an obround configuration.

6. The form of claim 1 further comprising multiple slots.

7. The form of claim 1 further comprising one or more scores on the main fold line.

8. A method of making a package from the form of claim 1, comprising the steps of:
   folding the first section onto the second section;
   securing the first section onto the second section so that the tandem slots at least partially fit over the tandem fold lines; and
   securing one or more holders onto the combination of the first and second sections.

9. The method of claim 8 wherein the first section is secured to the second section with an adhesive.

10. The method of claim 8 comprising the further step of placing one or more digital disks into the holders.

11. The method of claim 8 comprising the further step of folding the form into a book-like package.

12. The method of claim 11 comprising the further step of placing a slipcase onto the package.

* * * * *